May 27, 1969  H. KAMPER  3,445,901
FASTENERS
Filed Feb. 1, 1967
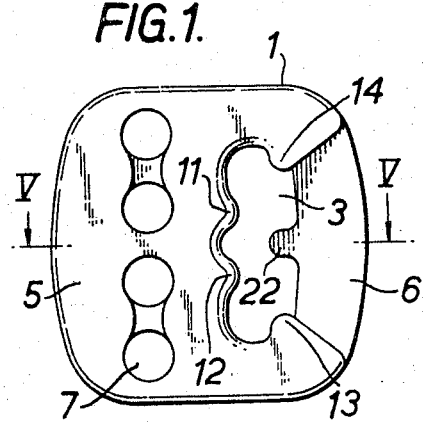
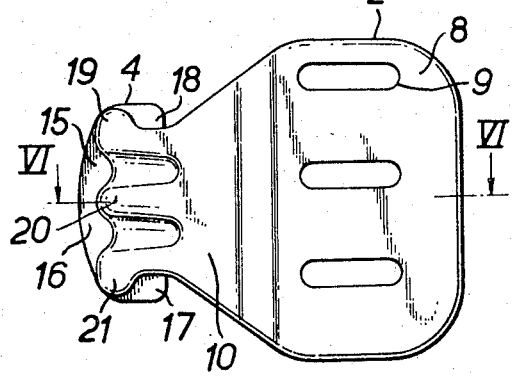
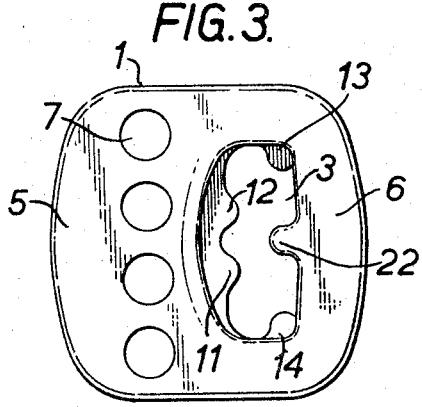
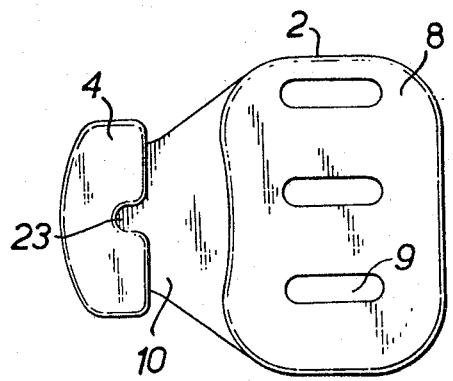
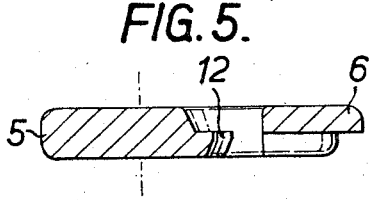
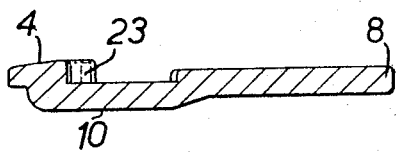
INVENTOR:
HELMUT KÄMPER

United States Patent Office 3,445,901
Patented May 27, 1969

3,445,901
FASTENERS
Helmut Kamper, Hannover, Germany, assignor to Brero & Co., Ipsach, Bern, Switzerland, a Swiss company
Filed Feb. 1, 1967, Ser. No. 613,193
Claims priority, application Germany, Feb. 2, 1966, K 58,305
Int. Cl. A44b 11/25
U.S. Cl. 24—201                2 Claims

ABSTRACT OF THE DISCLOSURE

A two-part fastener for detachably securing two clothing parts together including a hammerhead-shaped member and a complementary recessed member. Each member has a set of contact faces, the faces being disposed at the corners of a trapezium. The hammerhead-shaped member has three ribs which serve to reinforce the neck of the hammerhead and act as centering guides.

---

This invention relates to a two-piece thrust-action fastener made of resilient material.

One previously proposed fastener has a hammerhead-shaped member, carried by a neck portion on one baseplate, which can be connected, by turning and thrusting to an eyelet member mounted on another baseplate. Such thrust-action fastener is primarily intended for use on front-fastening brassieres, the baseplates, in the form of narrow webs, being let into the material of the garment. In this previously proposed fastener, the eyelet member is provided with bearing faces forming the four corners of a rectangle matching the block-shaped end of the other member of the fastenre. The all-around support thus given to the hammerhead-shaped member at the four corners makes the fastener very rigid when closed and makes it difficult to insert the hammerhead-shaped member into the eyelet member and to release the one from the other.

An object of the invention is to provide a fastener in which a hammerhead-shaped member can be inserted into the opening in the eyelet member even when out of alignment, and can likewise be released, simply and quickly.

According to the present invention there is provided in a thrust-action fastener of resilient material including a hammerhead-shaped member having a neck portion, and an eyelet member having an opening therein, complementary to the hammerhead of the hammerhead-shaped member and capable of engaging therein by twisting and lateral displacement, each said member having bearing faces of complementary form to the bearing faces of the other said member, the improvement comprising the provision of three ribs on the neck portion of the hammerhead-shaped member at the head end thereof, said bearing faces of the eyelet member positioned at the corners of an imaginary trapezium lying symmetrically about the longitudinal centre line of the eyelet member, said ribs being adapted, when the hammerhead member has been inserted into the opening of the eyelet member and fastener is closed, to enter spaces lying between the bearing faces of the members.

According to another feature of the invention, the neck portion tapers towards the head. The purpose of this is to ensure that the neck is stiffened against twisting at its widest part, while yielding to twisting at its narrowest part, that is to say near the head, so that the head may be readily twisted and turned when the fastener is being undone.

An embodiment of a fastener in accordance with the invention will now be described, by way of example, with reference to the accompanying diagrammatic drawing, in which:

FIGURE 1 is a plan, showing the upper face of the fastener.
FIGURE 2 is a plan, showing the upper face of the hammerhead-shaped member of the fastener;
FIGURE 3 is an inverted plan, showing the underside of the eyelet member of the fastener;
FIGURE 4 is an inverted plan, showing the underside of the hammerhead-shaped member of the fastener;
FIGURE 5 is a vertical section, along the line V—V in FIGURE 1, of the eyelet member of the fastener; and
FIGURE 6 is a vertical section, along the line VI-VI in FIGURE 2, of the hammerhead-shaped member of the fastener.

Referring now to the drawing, the two-piece thrust-action fastener, made of a resilient plastics material such as polyamide, consists of the two members 1 an 2, of which the member 1 forms the eyelet and contains an opening 3, into which the hammerhead-shaped end 4 of the member 2 can be introduced. The eyelet opening 3 is contained in a baseplate 5, and is bounded at the front by a thin bridge-piece 6. The plate contains a number of holes 7, for example four, arranged in pairs, to enable a needle to be passed through for the purpose of sewing plate 1 in position like a button.

In the form illustrated, the baseplate 8 of the other member 2, of the fastener is inserted between two layers of material and sewn in place, for which purpose weak zones are provided in the plate at 9, suitably spaced for stitching, to enable a needle to be pushed through. The hammehead end 4 of member 2 is carried by a substantially trapezoidal neck portion 10, which is offset from the plate 8, as can be seen from the cross-section in FIGURE 6, and which, when the fastener is assembled, comes to bear against the bridge-piece 6 of the eyelet member 1. The thickness of the material of the two members of the fastener is such that the interlocking parts 3 and 4, do not project beyond the bridge-pieces of the two baseplates.

On the underside, the eyelet opening 3 has four bearing faces 11, 12, 13 and 14, arranged at the corners of an imaginary trapezium positioned symmetrically about the longitudinal centre line of the fastener. The faces 15, 16, 17 and 18 of the end portion 4 come to bear against the said bearing faces and act to restrain disengagement should the fastener be subjected to excess tension. This end portion 4 is also strengthened by the ribs 19, 20 and 21, which make it very rigid and also serve to make the hammerhead-shaped member self-centering.

The flexibility needed to facilitate the release of the end portion 4 from the eyelet opening 3 by a turning movement, when the fastener is being undone, is derived from the trapezium-shaped design of the neck portion 10.

To hold the two interlocking members 1 and 2 central, when they are in the "closed" position and their planes undergo angular dispacement, a projecting lip 22, is provided in the middle of the bridge-piece 6, with a corresponding cut-out 23, in the head 4.

As the plate 5 of the eyelet member 1 of the fastener is attached button-fashion by stitches passing through the holes 7, it is easy to sew on, while the plate 8 of the head member 2 is sewn in between two thicknesses of material, in the usual way.

So that plate 8 may be conveniently held while it is being sewn in place, it is desirable when the fastener is being produced by injection moulding, to make the eyelet member 1 next to the plate 8 and leave them joined together by a runner, so that the plate 5 of the eyelet member provides a good hold and means of controlling the plate 8 while this is being sewn in.

Using the eyelet member 1 as a button, moreover, saves wasting time and material on buttonholing those parts of garments, such as waist-bands, on which a pull is exerted, so that here, too, the invention represents an improvement.

I claim:
1. In a thrust-action fastener of resilient material including a hammerhead-shaped flat member having a neck portion, and
- a flat eyelet member having an opening therein, complementary to the hammerhead of the hammerhead-shaped member and capable of engaging therein by tilting and lateral displacement,
- each said member having bearing faces of complementary form to the bearing faces of the other said member,
- the improvement comprising the provision of three longitudinally-extending ribs on the neck portion of the hammerhead-shaped member at the head end thereof,
- said bearing faces of the eyelet member and of the hammerhead-shaped member being arranged as two pairs and positioned symmetrically about the longitudinal centre line of the eyelet member and hammerhead-shaped member respectively, the surfaces of one said pair being closer together than those of the other pair,
- a bridge-piece forming part of the eyelet member and in part defining the opening therein,
- a lip projecting inwardly into the opening from the centre of the bridge-piece, and
- means defining a cutout in the periphery of the head of the hammerhead-shaped member complementary to said lip and on the reverse face to the ribs,
- whereby said lip serves to maintain the two members in aligned relationship whenever a force is applied tending to cause relative angular displacement,
- said ribs being adapted, when the hammerhead member has been inserted into the opening of the eyelet member and fastener is closed, to enter spaces lying between the bearing faces of the members and thereby serve in cooperation with said lip and cutout to centralize the hammerhead-shaped member during and subsequently to insertion of the eyelet member therein.

2. A thrust-action fastener of resilient material including a hammerhead-shaped member having a neck portion, and
- an eyelet member having an opening therein, complementary to the hammerhead of the hammerhead-shaped member and capable of engaging therein by tilting and lateral displacement,
- each said member having bearing faces of complementary form to the bearing faces of the other said member,
- the improvement comprising the provision of three ribs extending longitudinally of the neck portion of the hammerhead-shaped member at the head end thereof and terminating to form three rounded protuberances,
- said bearing faces of the eyelet member being positioned symmetrically about the longitudinal centreline of the eyelet member with one pair of bearing faces more closely spaced than the other pair,
- said hammerhead member having complementary bearing faces to those of the eyelet member and arranged to engage corresponding said eyelet member bearing faces when one member is fully engaged with the other,
- the two closer said bearing faces of the eyelet member having a space therebetween and an outer space adjacent each said bearing face, said spaces being of complementary form to the form of the three rounded protuberances of the hammerhead member, and
- said protuberances being adapted when the hammerhead member has been inserted into the opening of the eyelet member and fastener is closed, to enter complementary spaces lying between the bearing faces of the members and thereby serve to centralize the hammerhead-shaped member during insertion of the eyelet member therein.

References Cited

UNITED STATES PATENTS

| Re. 16,533 | 1/1927 | Slote. |
| 1,831,496 | 11/1931 | Jasina. |
| 2,765,471 | 10/1956 | Cousins. |

FOREIGN PATENTS

| 796,663 | 6/1958 | Great Britain. |
| 293,010 | 12/1953 | Switzerland. |

BERNARD A. GELAK, *Primary Examiner.*